(12) United States Patent (10) Patent No.: US 7,672,752 B2
Blaine et al. (45) Date of Patent: Mar. 2, 2010

(54) SORTING WORKPIECES TO BE PORTIONED INTO VARIOUS END PRODUCTS TO OPTIMALLY MEET OVERALL PRODUCTION GOALS

(75) Inventors: George Blaine, Lake Stevens, WA (US); John R. Strong, Kirkland, WA (US); Arthur W. Vogeley, Jr., Seattle, WA (US); Craig E. Pfarr, Issaquah, WA (US)

(73) Assignee: John Bean Technologies Corporation, Chicago, IL (US)

( * ) Notice: Subject to any disclaimer, the term of this patent is extended or adjusted under 35 U.S.C. 154(b) by 911 days.

(21) Appl. No.: 11/321,755

(22) Filed: Dec. 28, 2005

(65) Prior Publication Data

US 2006/0157388 A1 Jul. 20, 2006

Related U.S. Application Data

(60) Provisional application No. 60/640,282, filed on Dec. 30, 2004.

(51) Int. Cl.
*G07F 7/00* (2006.01)
(52) U.S. Cl. .............................. 700/213; 700/230
(58) Field of Classification Search ................ 209/3.2; 700/213
See application file for complete search history.

(56) References Cited

U.S. PATENT DOCUMENTS

| | | | |
|---|---|---|---|
| 4,875,254 A | 10/1989 | Rudy et al. | |
| 4,962,568 A | 10/1990 | Rudy et al. | |
| 5,019,716 A * | 5/1991 | Meier et al. | 270/52.2 |
| 5,585,603 A | 12/1996 | Vogeley, Jr. | |
| 5,732,939 A * | 3/1998 | Meier | 270/52.01 |
| 5,868,056 A | 2/1999 | Pfarr et al. | |
| 6,377,864 B1 * | 4/2002 | Lindstrom | 700/96 |
| 6,738,686 B2 * | 5/2004 | Caretta et al. | 700/213 |
| 2002/0185358 A1 * | 12/2002 | Zeitler et al. | 198/370.02 |
| 2005/0032471 A1 | 2/2005 | Pfarr et al. | |

FOREIGN PATENT DOCUMENTS

JP 8-6605 A2 1/1996

* cited by examiner

*Primary Examiner*—Gene Crawford
*Assistant Examiner*—Ramya Prakasam
(74) *Attorney, Agent, or Firm*—Christensen O'Connor Johnson Kindness PLLC

(57) ABSTRACT

A method is provided for sorting incoming products (e.g., chicken butterflies) to be portioned into two or more types of end products (e.g., sandwich portions, strips, nuggets, etc.) to meet production goals. The method includes generally four steps. First, information on incoming products is received. Second, for each incoming product, a parameter value (e.g., the weight of an end product to be produced from the incoming product) is calculated for each of the two or more types of end products that may be produced from the incoming product. Third, the calculated parameter values for the incoming products for the two or more types of end products, respectively, are normalized so as to meet the production goals while at the same time achieving optimum parameter values. Fourth, for each incoming product, the end product with the best (e.g., largest) normalized parameter value is selected as the end product to be produced from the incoming product.

20 Claims, 8 Drawing Sheets

SORTING WORKPIECES TO BE PORTIONED INTO VARIOUS END PRODUCTS TO OPTIMALLY MEET OVERALL PRODUCTION GOALS

CROSS-REFERENCE TO RELATED APPLICATION

This application is based on and claims the benefit of U.S. Provisional Application No. 60/640,282, filed Dec. 30, 2004.

TECHNICAL FIELD

The present application relates generally to processing workpieces, such as food products, and more specifically to sorting workpieces to be portioned into two or more types of end products in light of overall production goals.

BACKGROUND

Workpieces, including food products, are portioned or otherwise cut into smaller pieces by processors in accordance with customer needs. Also, excess fat, bone, and other foreign or undesired materials are routinely trimmed from food products. It is usually highly desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into smaller pieces of optimum sizes.

Portioning machines of the foregoing type are known in the art. Such portioning machines, or portions thereof, are disclosed in prior patents, for example, U.S. Pat. Nos. 4,962,568 and 5,868,056, which are incorporated by reference herein. Typically, the workpieces are first carried by an infeed conveyor past a scanning station, whereat the workpieces are scanned to ascertain selected physical characteristics, for example, their size and shape, and then to determine their weight, typically by utilizing an assumed density for the workpieces. In addition, it is possible to locate discontinuities (including voids), foreign material, and undesirable material in the workpiece, for example, bones or fat in a meat portion. The data and information measured/gathered by the scanning devices are transmitted to a computer, typically on board the portioning apparatus, which records the location of the workpiece on the conveyor as well as the shape and other characteristics of the workpiece. With this information, the computer determines how to optimally cut or portion the workpiece at the portioning station, and the portioning may be carried out by various types of cutting/portioning devices.

It is desirable to sort randomly sized incoming products (e.g., chicken breast butterflies) into multiple lines for producing different types of end products (e.g., sandwich portions, chicken strips, chicken nuggets, etc.) such that each of the sorted incoming products is optimally suited for producing the particular end product. For example, certain incoming products may be better suited for producing type A end products, while other incoming products may be better suited for producing type B end products. These incoming products should be sorted into two lines for producing type A end products and type B end products, respectively.

Current methods of sorting workpieces into multiple lines for producing different types of end products are based on rather simple rules of thumb. An example of a rule of thumb is that some end products are best produced from heavier incoming products, while other end products are best produced from lighter incoming products. In this example, incoming products are weighed and sorted to multiple lines based solely on their weight. Naturally, these sorting methods are not as accurate as desired. Furthermore, these sorting methods do not consider the overall production goals to be met. Specifically, for each portioning process, a user typically sets certain production goals that need to be met. The production goals may entail, for example, specific quantities of various end products to be produced at the end of the portioning process. If sorting is carried out based on the weight-based rule of thumb, for example, and if there are approximately equal numbers of heavier incoming products and lighter incoming products, then the sorting may produce approximately equal quantities of the end products that are best produced from heavier incoming products (e.g., type A end products) and the end products that are best produced from lighter incoming products (e.g., type B end products). The production goals, however, may actually require that more or less type A end products be produced than type B end products. Then, at the end of the portioning process, the production goals are not met.

A need exists for a method and system for sorting incoming products to produce various types of end products while meeting overall production goals.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present invention, a method is provided for sorting incoming products (e.g., chicken butterflies) to be portioned into two or more types of end products (e.g., sandwich portions, strips, nuggets, etc.) to meet production goals. The method includes generally four steps. First, information on incoming products is received. Second, for each incoming product, a parameter value is calculated for each of the two or more types of end products that may be produced from the incoming product. A parameter value may be any value that indicates the suitability of an incoming product for producing a certain end product. For example, a parameter value may be a yield value (the weight of an end product that can be produced from the incoming product), and the yield value may be calculated for each of the two or more types of end products. Third, the calculated parameter values for the incoming products for the two or more types of end products are normalized so as to meet the production goals, while at the same time achieving optimum parameter values. In other words, the calculated parameter values are adjusted so as to meet the production goals, but are adjusted only to the extent necessary to meet the production goals so that the adjusted parameter values are still optimum within the confine of meeting the production goals. Fourth, for each incoming product, the end product with the best (e.g., the largest or highest) normalized parameter value is selected as the end product to be produced from that incoming product.

In accordance with various exemplary embodiments of the present invention, a method for sorting incoming products to be portioned into two or more types of end products to meet production goals is encoded as computer-executable instructions and stored in a computer-readable medium. The computer-executable instructions, when loaded onto a computer (or processor), cause the computer to carry out a method of the present invention.

In accordance with one aspect of the invention, the computer-executable instructions cause the computer to receive feedback from results of actual sorting and further to perform the step of normalizing the calculated parameter values to meet the production goals in light of the received feedback. The feedback may include information such as: a flow rate of actual sorting; a rate of change of the flow rate of actual sorting; a status of a buffer used in actual sorting, total end products produced, and production trends.

In accordance with another aspect of the invention, the parameter value to be used to indicate the suitability of an incoming product for producing a certain end product may include, for example, a yield value (the weight of an end product to be produced), a yield percentage value (the weight of an end product divided by the weight of the incoming product from which the end product is to be produced), a total (economic) value (e.g., the value of an end product + the value of any trim produced during portioning of the end product − the cost of the incoming product from which the end product is to be produced), a value indicating lack of defects in an incoming product, a geometric attribute value of an incoming product, and a visual attribute value of an incoming product.

In accordance with yet another aspect of the present invention, the calculated parameter values for the two or more types of end products are normalized by adding a factor to, or multiplying a factor with, each of the calculated parameter values. A specific factor is found for each of the two or more types of end products.

In accordance with still another aspect of the invention, the computer-executable instructions continually (e.g., periodically, or upon a user request) perform the steps of: (a) receiving information on additional incoming products; (b) calculating, for each of the additional incoming products, a parameter value for each of the two or more types of end products that may be produced from the additional incoming product; (c) normalizing the calculated parameter values so as to meet the production goals while achieving optimum parameter values; and (d) for each additional incoming product, selecting the end product with the best (e.g., the largest) normalized parameter value as the end product to be produced therefrom.

In accordance with another aspect of the invention, the production goals may entail: (a) weight values of the two or more types of end products to be produced (e.g., X pounds of type A end products, Y pounds of type B end products, etc.); (b) weight percentage values of the two or more types of end products to be produced (e.g., X weight percentage of type A end products and Y weight percentage of type B end products, where X+Y=100); (c) efficiently sorting the incoming products to collection bins (e.g., batch processing); (d) sorting the incoming products to continuous portioning processing to be carried out at an optimal capacity; and (e) sorting the incoming products to collection bins and to continuous portioning processing to be carried out at an optimal capacity. In accordance with a further aspect of the present invention, the production goals may be modified continually (e.g., periodically, upon a user request, or to compensate for the over- or under-achieved production goals). Then, the step of normalizing the parameter values may be performed to meet the modified production goals.

In accordance with various exemplary embodiments of the present invention, a system is provided for sorting incoming products to be portioned into two or more types of end products to meet production goals. The system includes a processor and a scanner coupled to the processor for scanning incoming products. The processor is configured to perform the steps of: (i) receiving the scanned information of the incoming products from the scanner; (ii) for each incoming product, calculating a parameter value for each of the two or more types of end products that may be produced from the incoming product; (iii) normalizing the calculated parameter values for the incoming products for the two or more types of end products, respectively, so as to meet the production goals while achieving optimum parameter values; and (iv) for each incoming product, selecting the end product with the best (e.g., the largest) normalized parameter value as the end product to be produced therefrom.

In accordance with one aspect of the present invention, the system further includes a product diverter configured to automatically sort the incoming products into two or more lines for producing the two or more types of end products, respectively. In some embodiments, at least one of the two or more lines may send sorted incoming products to a collection bin. In these embodiments, the processor may be configured to perform the further steps of: (a) receiving feedback from results of actual sorting to the collection bin; and (b) normalizing the calculated parameter values for the incoming products for the two or more types of end products, respectively, so as to meet the production goals in light of the received feedback. The feedback information may include, for example, a flow rate of actual sorting to the collection bin; a rate of change of the flow rate of actual sorting to the collection bin, total incoming products collected in the bin, and production (or collection) trends. In other embodiments, at least one of the two or more lines may send sorted incoming products to continuous portioning processing. In these embodiments, the processor may be configured to perform the further steps of: (a) receiving feedback from results of actual sorting to the continuous portioning processing; and (b) normalizing the calculated parameter values for the incoming products so as to meet the production goals in light of the received feedback. The feedback information may include, for example, a flow rate of actual sorting through the continuous portioning processing; a rate of change of the flow rate of actual sorting through the continuous portioning processing; a status of a buffer used in the continuous portioning processing, total end products produced, and production trends.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
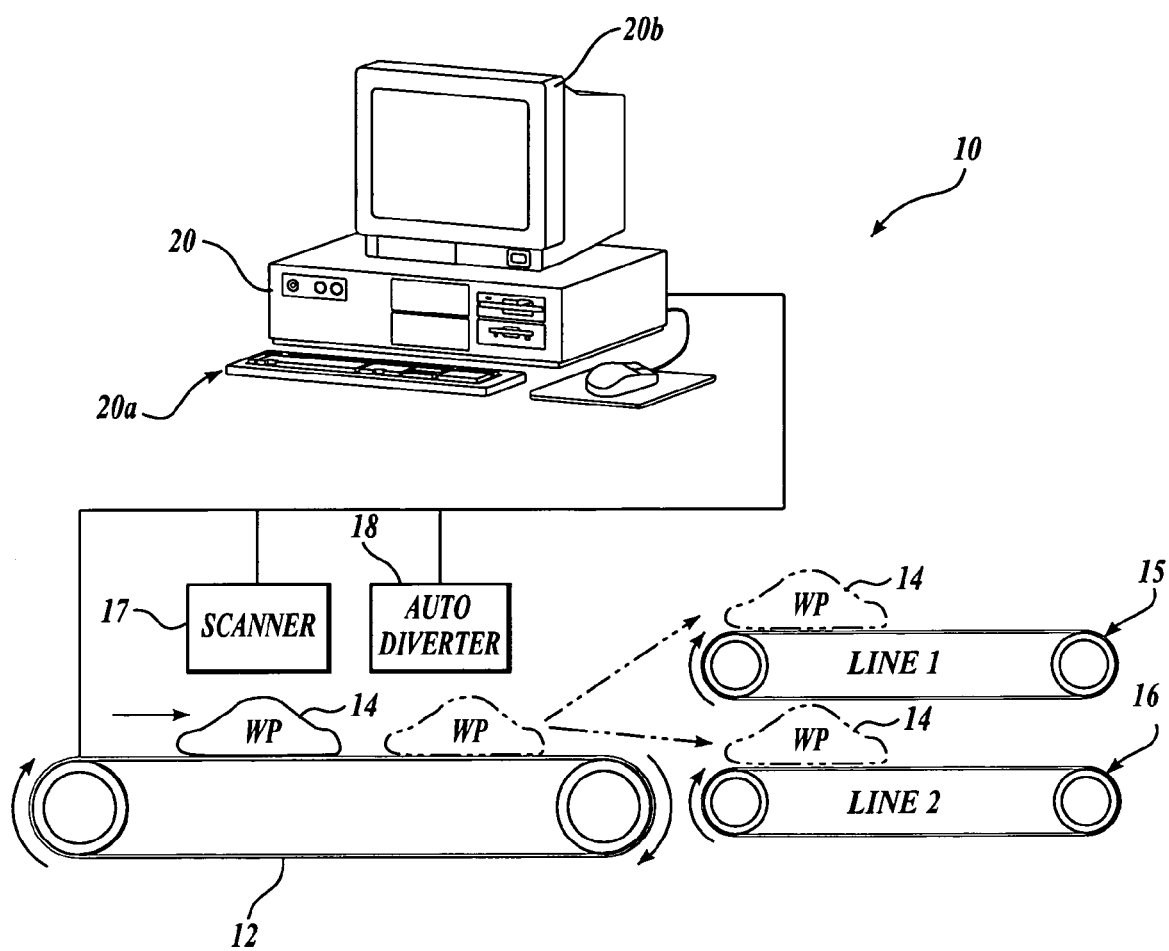
FIG. 1 illustrates a system suitable for use in performing a method of the present invention, wherein the system is operated to process and sort incoming workpieces (WP)

FIG. 1 schematically illustrates a system 10 suitable for implementing one embodiment of the present invention. The system 10 includes a conveyor 12 for carrying an incoming workpiece (WP) 14 to be sorted into multiple lines 15, 16 for producing different types of end products. The system 10 further includes a scanner 17 for scanning the workpiece 14. The system 10 may still further include an auto-diverter 18 for automatically diverting the incoming workpiece 14 into different lines 15, 16. The conveyor 12, scanner 17, and auto-diverter 18 are coupled to, and controlled by, a processor 20. The processor 20 includes an input device 20a (keyboard, mouse, etc.) and an output device 20b (monitor, printer, etc.). Generally, the scanner 17 scans in the workpiece 14 to produce scanning information representative of the workpiece, and forwards the scanned information to the processor 20. The scanner 17 may be of a variety of different types, including a video camera to view the workpiece 14 illuminated by one or more light sources (not shown). In lieu of a video camera, the scanner 17 may instead utilize an x-ray apparatus for determining the physical characteristics of the workpiece 14, including its shape, mass, and weight, as described in U.S. Pat. No. 5,585,603, which is herein incorporated by reference.

The processor 20 analyzes the scanned information to develop a thickness profile of the scanned workpiece 14. The processor 20 also develops an area and/or volume distribution of the scanned workpiece 14. The processor 20 then models the workpiece 14 to simulate portioning the workpiece 14 into two or more types of end products of specific physical criteria, including, for example, shape, weight, thickness, and size. Each of the lines 15 and 16 for producing a specific type of end products includes a cutter, trimmer, etc. (not shown) which are necessary to produce the specific type of end products.

The present invention is directed to sorting incoming products to produce two or more types of end products so as to optimally meet overall production goals. As used herein, the term "production goals" are used to cover a broad range of goals that a user wishes to meet during and/or at the end of each portioning process. For example, the production goals may define a final output of a portioning process, such as the specific quantities or weights of various types of end products to be produced (e.g., X pounds of type A end products, Y pounds of type B end products, etc.) or the specific weight percentage of each end product to be produced relative to the total weight of all end products (e.g., X % weight of type A end products, Y % weight of type B end products, Z % weight of type C end products, wherein X+Y+Z=100).

As further examples, the production goals may define a broad range of desirable portioning process configurations or desirable (e.g., efficient) portioning processes themselves. For example, a portioning process may be configured as a batch process (e.g., sorting all incoming products into collection bins for later processing/portioning), a continuous process (e.g., sorting all incoming products and directing them to active portioning lines), or a hybrid of batch and continuous processing. When a batch process is used, it may be desirable to monitor the sorting process to ensure that the incoming products are filling up the collection bins properly in terms of, for example, a flow rate of actual sorting to the collection bin; a rate of change of the flow rate of actual sorting to the collection bin, total incoming products collected in the bin, etc. When a continuous or hybrid process is used, it may be desirable to monitor the sorting process to ensure that each of the continuous process lines for processing (e.g., portioning) the sorted incoming products is operated at maximum capacity. For example, when line 1 for producing type A end products is operating at its maximum capacity while line 2 for producing type B end products has little or no incoming products to process, then it may be desirable to divert some of the incoming products from line 1 to line 2 to make a maximum use of the overall system. Thus, in these examples, the production goals may define goals that a user wishes to meet during a sorting/portioning process itself, such as efficient sorting into collection bins during batch processing, and efficient use of each production (or portioning) line at capacity during continuous or hybrid processing. These production goals and how they can be met will be further described below in reference to FIGS. 4A-4C. It should be noted that the production goals may be continually modified during a sorting/portioning process.

As used herein, a "parameter" or "parameter value" means any value that indicates the suitability or desirability of an incoming product for producing a certain end product. For example, a parameter value may be a yield (i.e., the weight of an end product that can be produced from an incoming product), a yield percentage (i.e., the weight of an end product divided by the weight of the incoming product from which the end product is produced), or a total (economic) value of an end product (e.g., the value of an end product + the value of any trim produced when the end product is portioned from an incoming product − the cost of the incoming product). It should be understood that a total value of an end product may be defined or calculated in various other ways to capture a specific economic value in each application. For example, a total value may include the portioning process cost, labor cost, equipment lease cost, a net profit from the portioning process, etc.

Parameter values for use in a method of the present invention may also include certain geometrical or visual attribute values of incoming products, which indicate the suitability of the incoming products for producing various types of end products. For example, certain geometric shapes, sizes, colors, or texture of incoming products may be deemed to indicate their suitability for producing certain end products. As one specific example, a larger incoming product may not be best suited for producing certain smaller-size end products because it will take a longer time to complete portioning of the larger incoming product into a number of the smaller-size end products. Thus, the (small) size of an incoming product relative to a particular end product may be used as a parameter to indicate the suitability of the incoming product for producing the end product. As another example, lack of defects, such as holes, large tears, bone, fat, etc., found in incoming product may be used as a parameter to indicate the suitability of the incoming product for use in producing a certain end product. Note that lack of defects may be closely correlated with yield or yield percentage, since any presence of defects that would make the incoming product unsuited for producing a certain end product will result in the reduced or minimum yield or yield percentage value for the same end product.

It should be noted that some of these parameters may be used to indicate that certain incoming products are not suited for producing any type of end products. For example, an unusually large size of the incoming product to significantly slow down the portioning process or the presence of serious defects in the incoming product, as quantified in terms of a parameter value, may indicate that the incoming product is not suited for producing any type of end products. If so, those incoming products that are determined to be wholly unusable may be simply removed from the production line or may be tagged (in software) so as not to undergo any subsequent portioning processing.

In accordance with the present invention, the parameter values are normalized so as to meet the production goals while at the same time achieving "optimum" parameter values. As used herein, meeting the production goals while achieving "optimum" parameter values, or "optimally" meeting the production goals, means meeting the production goals while achieving or maintaining a parameter value at its optimum level, i.e., the best possible level achievable while at the same time meeting the production goals.

As used herein, to "normalize" parameter values means to adjust or conform the parameter values to the production goals. In other words, the production goals are used as the standards to be met. Thus, the initial value of a parameter (e.g., yield) calculated to indicate the suitability of a certain incoming product for producing a particular end product is adjusted (or normalized) to an "optimum" parameter value, which may not be the best (e.g., the highest) possible parameter value for this particular end product, but is still the optimum parameter value that could meet the production goals. For example, even when some incoming products may have the highest parameter values associated with type A end products and thus may be assessed as best suited for producing type A end products, if the production goals for end products A have already been met or are about to be met, then these incoming products should be sorted to produce other end products. To that end, the parameter values indicating the suitability of these incoming products for producing type A end products may be "normalized" (e.g., lowered from the initial values relative to the parameter values of other types of end products) in order to meet the overall production goals.

Figure 2A:
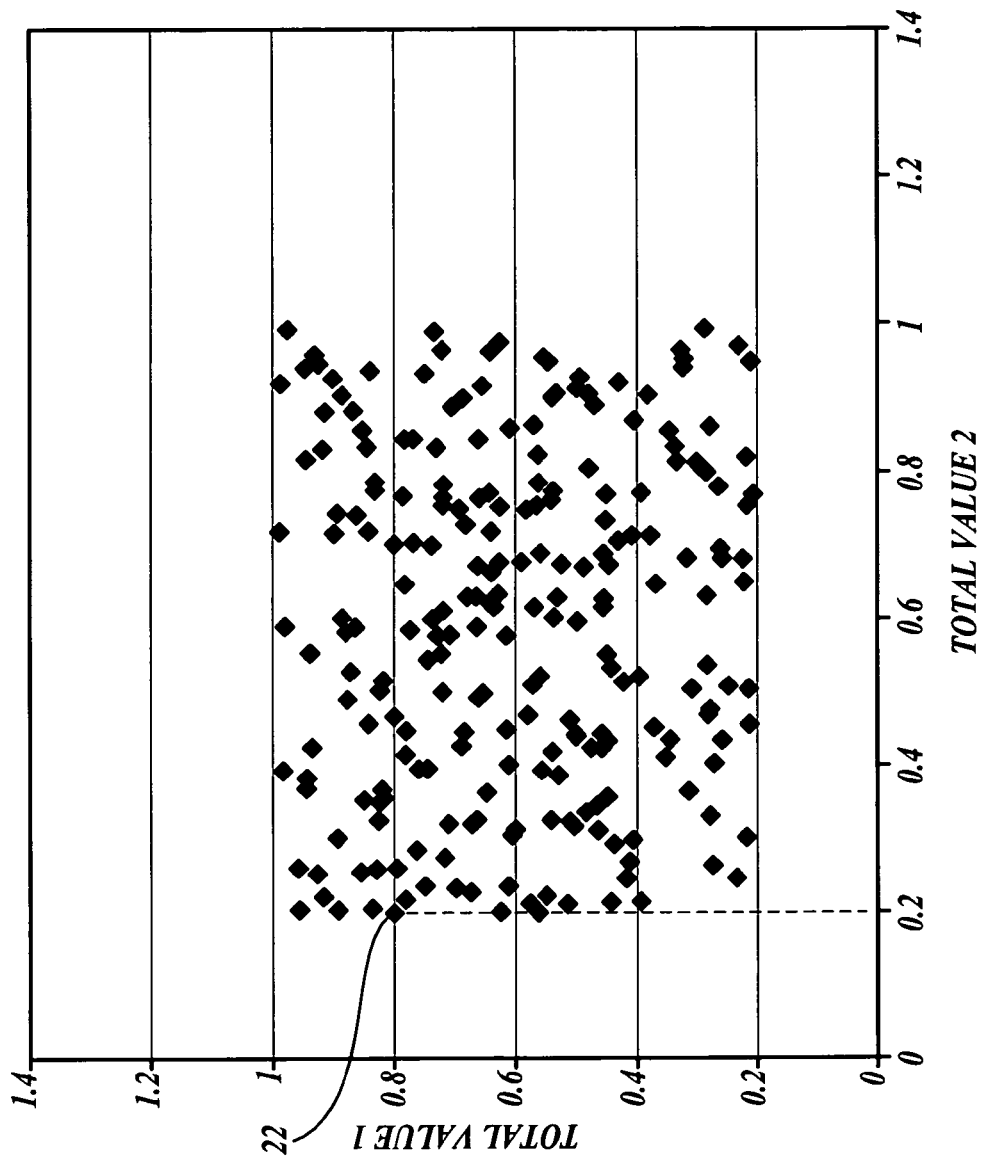
FIGS. 2A-2C illustrate a method of normalizing parameter values for incoming products for two or more types of end products, respectively, so as to meet production goals, in accordance with the present invention.
Figure 2B:
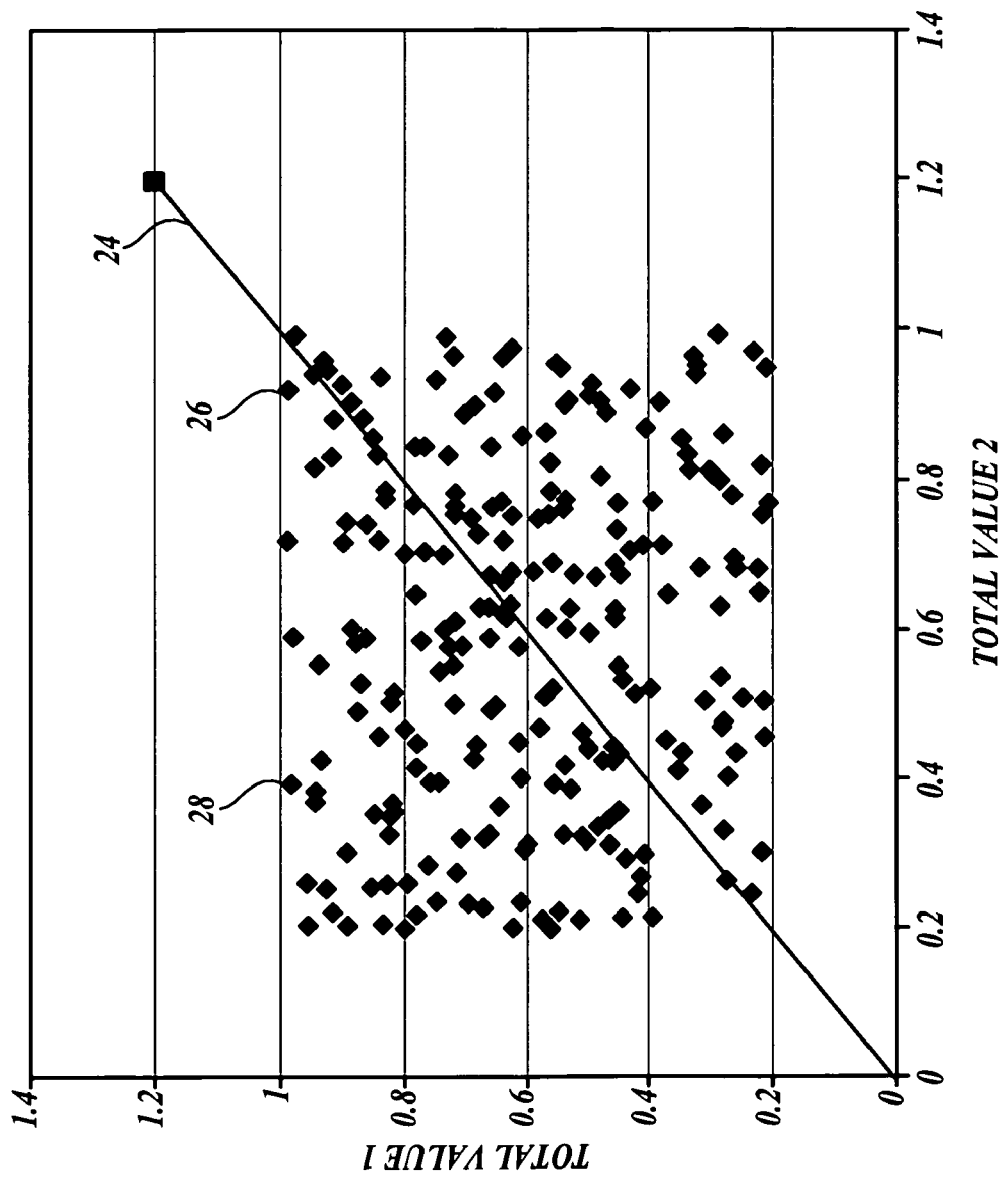
Figure 2C:
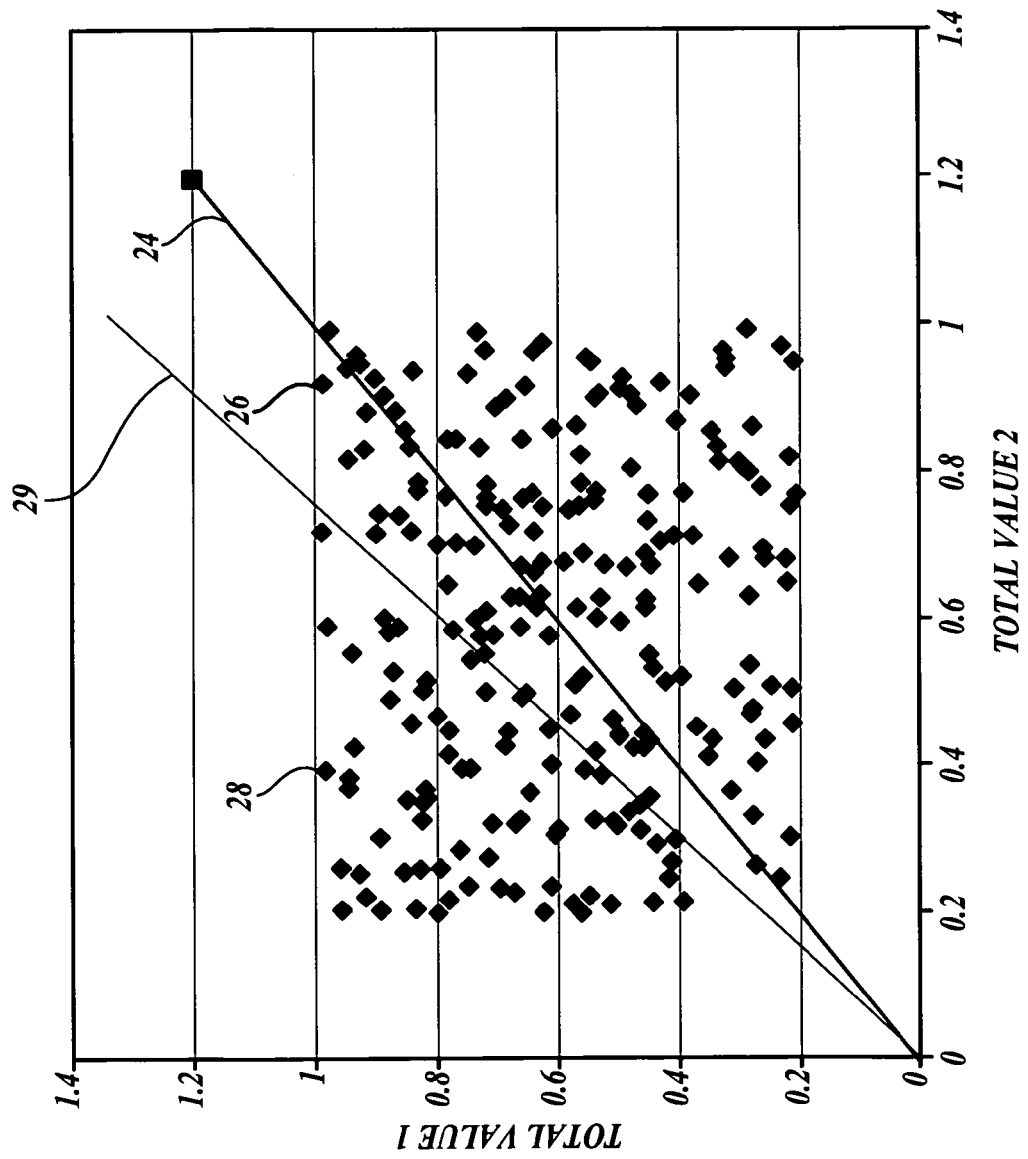

The concept of normalizing parameter values so as to meet the production goals is now described and illustrated in FIGS. 2A-2C.

In the present description, it is assumed that there are a number of incoming products (e.g., chicken breast butterflies) to be sorted to produce two or more types of end products (e.g., sandwich portions, strips, nuggets, etc.). A parameter to be used in this illustration is the total value of an end product (e.g., the value of an end product + the value of any trim produced during production of the end product − the cost of the incoming product from which the end produce is produced). Such total value may be readily calculated based on the known weight of an incoming product, the known weight of each type of end product to be produced, and values per weight of the incoming product, end product, and trim. It is further assumed that the production goals to be met in the present illustration require a fixed (weight) percentage of each type of end products to be produced (e.g., X % weight of end products 1 and Y % weight of end products 2, where X+Y=100). The goal here is to meet the production goals while at the same time maximizing the total value that can be derived from each of the incoming products to be processed and portioned. To that end, first, the population characteristics of the incoming products may be ascertained.

FIG. 2A is a graph showing the population characteristics of the incoming products, wherein each dot represents one incoming product and is plotted to indicate the total value if used to produce end product 1 (along the "Total Value 1" axis") and the total value if used to produce end product 2 (along the "Total Value 2" axes). For example, dot 22 represents an incoming product, which will have the total value of 0.8 if used to produce end product 1, and will have the total value of 0.2 if used to produce end product 2. The units of the axes may be any monetary or other units of (economic) value to the users. Though FIG. 2A shows a 2-dimensional graph to illustrate a simple case where the incoming products are to be sorted to produce two types of end products 1 and 2, it should be understood that an N-dimensional graph may be similarly created for a case where the incoming products are sorted to produce N types of end products.

If there are no specific production goals or if the production goals are to be simply ignored, then the highest total value would be achieved by sorting each end product to produce the end product that gives the highest total value. For example, the incoming product represented by dot 22 in FIG. 2A should be sorted to produce end product 1, because the total value derived from producing end product 1 out of this incoming product is 0.8, which is higher than the total value derived from producing end product 2 out of the same incoming product, 0.2. Graphically, the determination as to which type of end product should be produced from each incoming product can be made, in the 2-dimensional case, by drawing a 45-degree dividing line, along which the total value for end product 1 equals the total value for end product 2. FIG. 2B shows the same graph as FIG. 2A, but with a 45-degree dividing line 24. If the incoming products are to be sorted without any regard to the production goals, then the incoming products above the dividing line 24 should be sorted to produce end products 1 (because the total value derived from producing end product 1 out of each of these incoming products is higher than the total value derived from producing end product 2 out of the same incoming product). Likewise, the incoming products below the dividing line 24 should be sorted to produce end products 2.

In many cases, sorting done without any regard to specific production goals will result in an undesirable imbalance among various end products produced, contrary to the production goals. For example, referring to FIG. 2B, the 45-degree dividing line 24 sorts the incoming products into two generally equal amounts (quantities) for producing end products 1 and 2, respectively. Also, since the weight of each end product 1 and the weight of each end product 2 are known, the total weight of end products 1 and the total weight of end products 2 to be produced from the incoming products can be calculated. If the ratio between the total weight of products 1 and the total weight of products 2 is, for example, 7:3, while the production goals actually require the total weight ratio of 1:1, then the production goals are not met based on the current sorting. In this example, even though the highest total value is derived with respect to each individual incoming product, too much products 1 and too little end products 2 are produced contrary to the production goals.

In order to meet the production goals while at the same time achieving optimum total values, in accordance with the present invention, the total values that are initially calculated are normalized. In the illustrated example of FIG. 2B, the normalization process can be considered as the process of allowing a determination as to which of the incoming products that are initially designated to produce end products 1 should be re-designated to produce end products 2 instead, so as to meet the production goals. The incoming products to be re-designated should be those with the least loss of value, or with the lowest conversion cost. For example, between dots 26 and 28 of FIG. 2B, which both represent the incoming products that are initially designated to produce end products 1, dot 26 has the lowest conversion cost because, although the total value as an end product 1 is roughly the same for both dots 26 and 28, the total value when converted into an end product 2 is higher for dot 26 (about 1.0) than for dot 28 (about 0.4). In other words, between dots 26 and 28, dot 26 has the least loss of value when converted to produce end product 2. The conversion (or re-designation) of the incoming products in this manner may continue until the production goals are met. In the present example, where the initial sorting produced the total weight ratio of 7:3, for example, while the production goals actually require the ratio of 5:5, the conversion of the incoming products with the lowest conversion cost from end products 1 to end products 2 continues until the ratio of 5:5 is achieved.

For the purpose of simplifying the explanation, assume that the production goals in the present example are set in terms of the total value for each conversion alternative (end products 1 and 2). Then, the conversion cost associated with converting an incoming product, which was initially designated to produce end product 1, to instead produce end product 2, can be expressed as:

$$\text{Conversion Cost} = (V1-V2)/V2 = V1/V2 - 1$$

where V1 is the total value derived from producing an end product 1 from an incoming product, and V2 is the total value derived from producing an end product 2 from the same incoming product. FIG. 2C graphically illustrates the concept of conversion cost and the normalization process in accordance with the present invention. In FIG. 2C, the line 24 is the 45-degree dividing line, while a line 29 is a new dividing line which has been moved from the 45-degree dividing line 24 so as to meet the production goals (i.e., by converting some of the incoming products, previously designated to produce end products 1, to produce end products 2 instead). The term V1/V2 in the Conversion Cost formula above is the slope of the new dividing line 29, and 1 is the slope of the 45-degree dividing line 24. As the new dividing line 29 is further rotated with respect to the 45-degree dividing line 24, the more incoming products are converted to produce different end products, at an increased conversion cost of V1/V2−1.

Thus, the process of normalizing parameter values can be considered as a process necessary to find the new dividing line 29, which sorts all incoming products to produce multiple types of end products to meet the production goals while at the same time maintaining the parameter values at their optimum levels (e.g., at the lowest total conversion cost). The new dividing line 29 can be found, for example, using linear least squares fitting, i.e., by finding a linear function that is least squares fitted to a set of dots, which represent the incoming products that are to be converted from one end product type to the other end product type so as to meet the production goals. In the present example, the new dividing line 29 can be expressed as:

$$\text{New Dividing Line: Total Value } 1 = ((V1/V2)*\text{Total Value } 2) + B$$

where (V1/V2) is the slope of the dividing line 29, and B is its intercept with the axis of Total Value 1.

In general, the population of incoming products has a similar set of defining statistical characteristics over time. Thus, once the values (V1/V2) and B are found, they may be fairly constant. Then, the same new dividing line 29 can be used to sort incoming products over time. It is certainly possible, and perhaps may be even preferable, however, to continually calculate and update the values (V1/V2) and B based on real data of new incoming products. In other words, the new dividing line 29 can be continually defined in view of the population characteristics of the incoming products that may change over time.

Continuing the simplified example, the above-described concept of conversion cost and normalization can be applied in 3 or more dimensions (i.e., where the incoming products are to be sorted to produce 3 or more types of end products). In this connection, the inventors of the present application have discovered that finding the slope (V1/V2) for the new dividing line to redistribute incoming products is analogous to multiplying (or adding) different factors to the total values of different types of end products, respectively, to achieve the same redistribution of the incoming products. Based on this discovery, the inventors have further found that any N-dimensional space can be divided into N sectors by multiplying (or adding) a factor to each of the total values associated with N types of end products, respectively, in a manner similar to how the 2-dimensional space can be divided into 2 sectors by changing the slope of the 45-degree dividing line 24 to that of the new dividing line 29. This novel approach discovered by the inventors transforms the total values of N types of end products into an N-dimensional space to thereby permit comparison among the total values of N types of end products.

In one embodiment, N multiplying factors may be constrained to multiply together to a product of 1, so as to keep the factors from drifting upon subsequent corrections of the factors. Likewise, N adding factors may be constrained to have a mean value of 0 so as to prevent their drifting. As discussed above, since the population of incoming products has a similar set of defining statistical characteristics over time, the multiplying (or adding) factor to be applied to each type of end product, once found, should be fairly constant. However, as the population characteristics of the incoming products may change over time, the factor may be continually updated.

Figure 3:
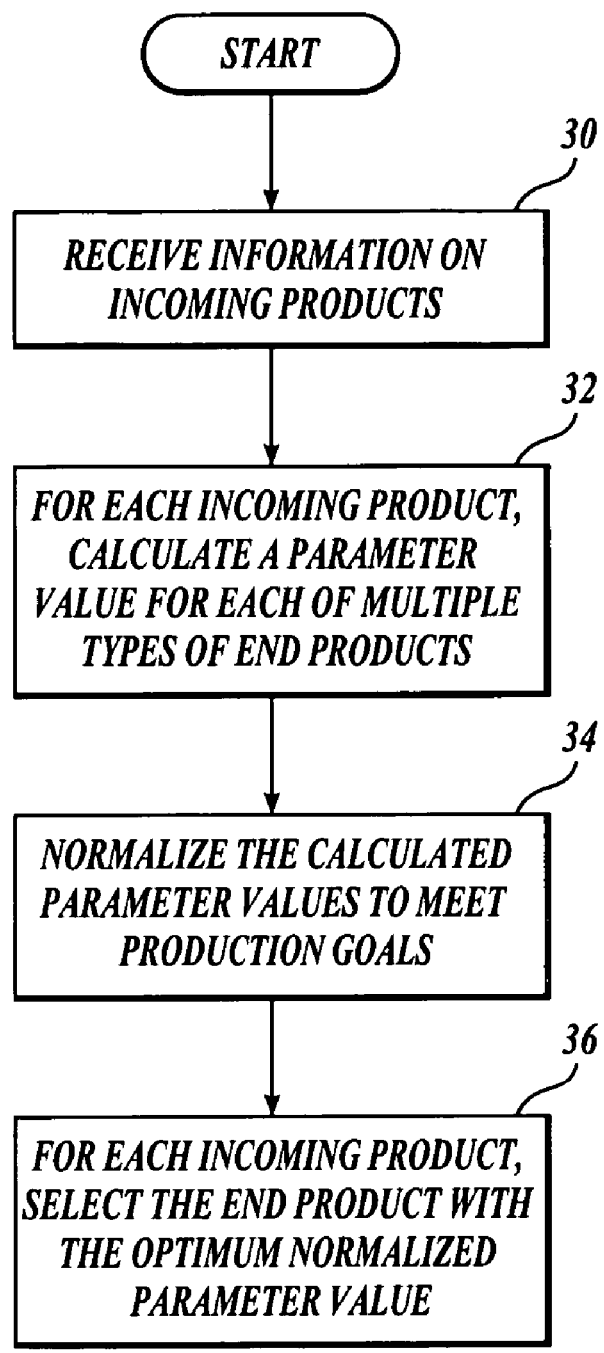
FIG. 3 is a flow chart illustrating a method for sorting incoming products to be portioned into two or more types of end products to optimally meet production goals, in accordance with the present invention.

FIG. 3 is a flow chart illustrating a method of the present invention for sorting incoming products to be portioned into two or more types of end products to meet production goals. In step 30, information on incoming products is received. For example, this step may be performed when the processor 20 receives scanned information of incoming products (or workpieces 14 in FIG. 1) from the scanner 17. In step 32, for each incoming product, a parameter value is calculated for each of the two or more types of end products that may be produced from the incoming product. For example, if a yield value (the weight of an end product) is used as a parameter, then the yield value is calculated for each type of end product that may be produced from the particular incoming product. In step 34, the calculated parameter values for the incoming products for the two or more types of end products, respectively, are normalized so as to meet the production goals while at the same time achieving optimum parameter values. Lastly, at step 36, for each incoming product, the end product with the best (e.g., the largest) normalized parameter value is selected as the end product to be produced from the incoming product. As discussed in detail above in reference to FIGS. 2A-2C, the process of normalizing parameter values to meet the production goal and selecting an end product with the best normalized parameter for each incoming product may be achieved by finding a dividing line, which sorts the incoming products to produce different types of end products to meet the production goals. In one embodiment, all of these steps 30-36 may be performed by the processor 20. Further, in various exemplary embodiments of the present invention, these steps 30-36 are coded in computer-executable instructions and stored in a computer-readable medium. The computer-executable instructions, when loaded onto a computer (processor), cause the computer to carry out the method of the present invention.

In various exemplary embodiments, when a particular end product to be produced from each incoming product is selected in step 36, such selection may be promptly executed to actually sort the incoming product. Further, such selection may be stored in the memory of the processor 20.

Figure 4A:
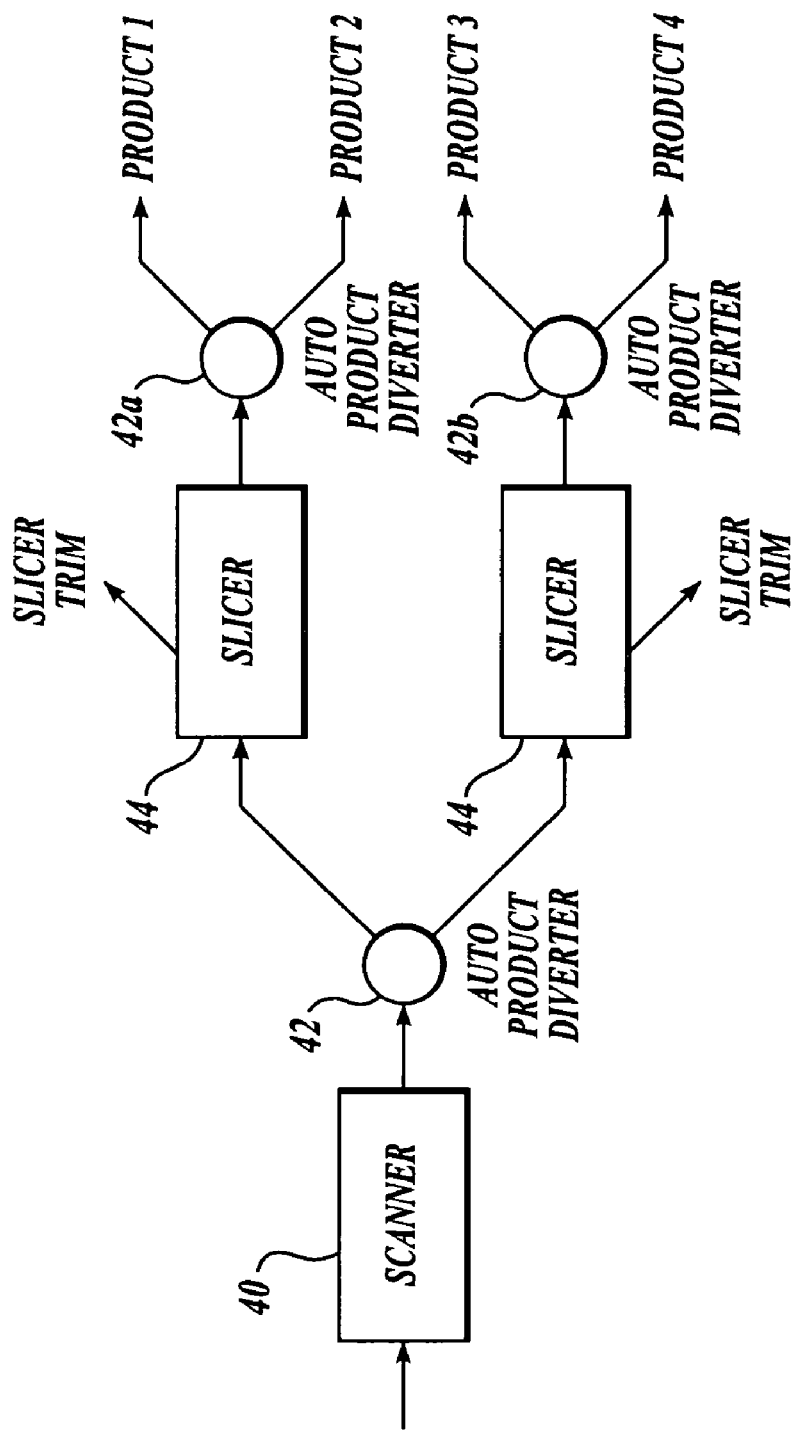
FIGS. 4A-4C illustrate three alternative configurations of a system for sorting incoming products to be portioned into two or more types of end products, in accordance with the present invention.
Figure 4B:
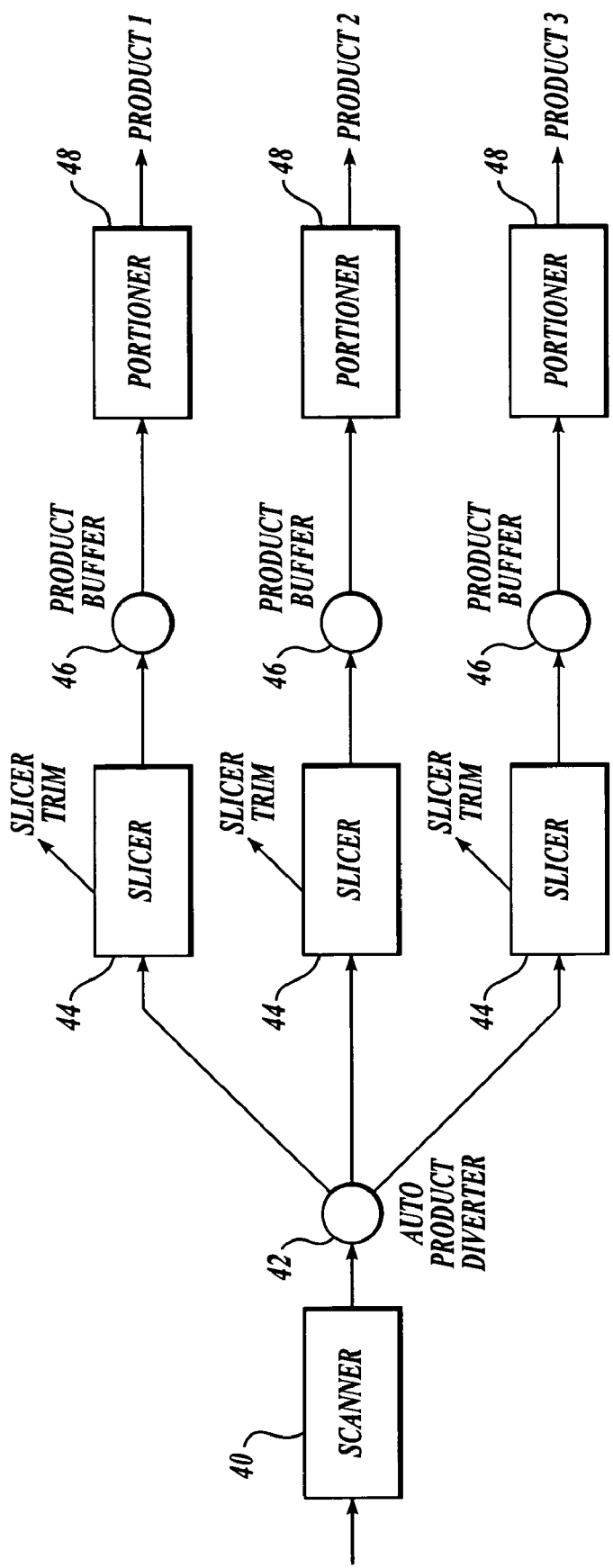
Figure 4C:
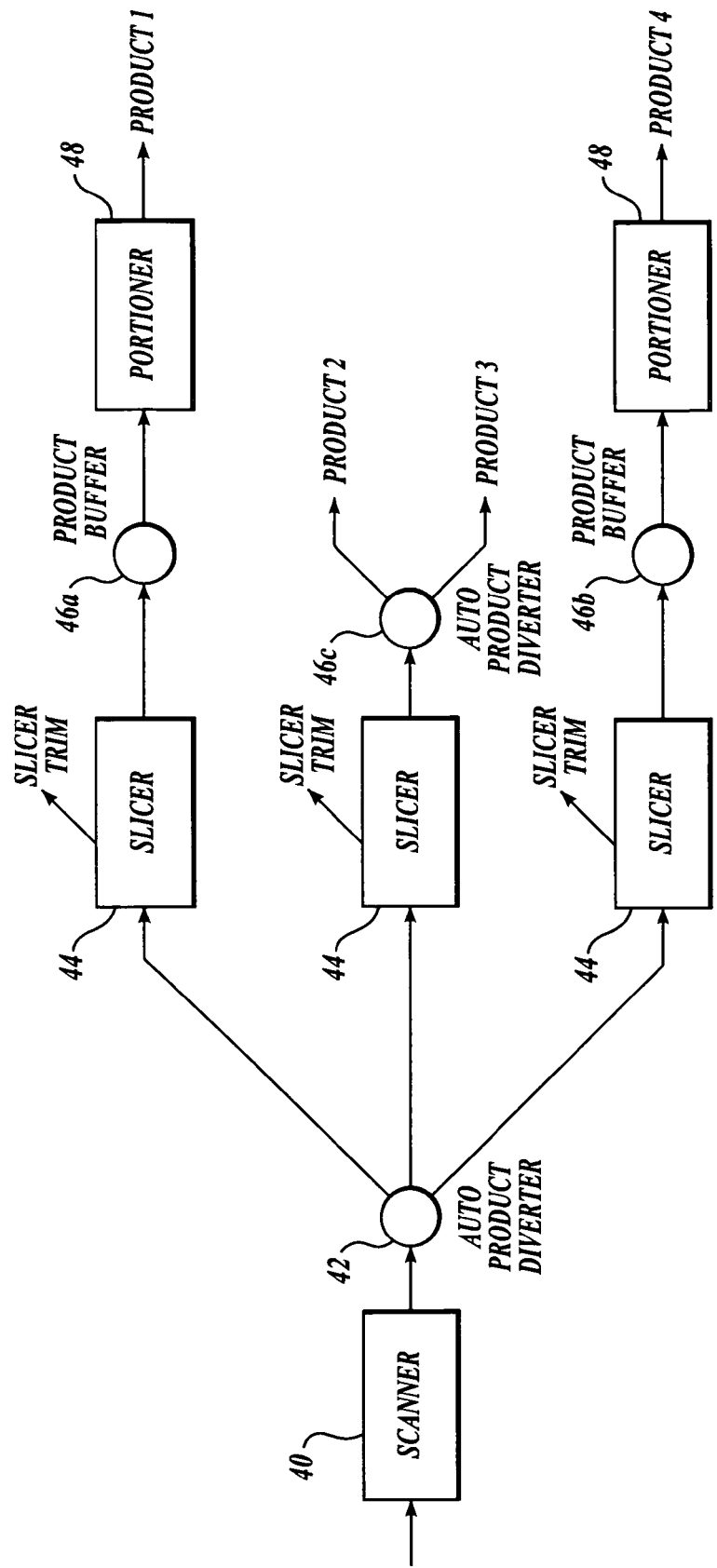

As defined above, the term "production goals" means a broad range of goals that a user wishes to meet during and/or at the end of each portioning process. For example, the production goals may define a broad range of desirable portioning process configurations or desirable (e.g., efficient) portioning processes themselves. FIGS. 4A, 4B, and 4C illustrate three exemplary portioning process configurations using batch processing, continuous processing, and hybrid processing, respectively, which may be used to define the production goals.

FIG. 4A illustrates batch processing, in which all incoming products are sorted into collection bins for later processing/portioning. Incoming products are first scanned by a scanner 40 and sorted to produce different types of end products according to a method of the present invention. Thereafter, the sorted incoming products are automatically diverted by an auto product diverter 42 [or 18 in FIG. 1] onto two different lines, each equipped with a servo slicer 44. Each of the servo slicers 44 performs a predefined slicing operation to the incoming product to produce a slicer trim. The sliced incoming products on each line are forwarded to another auto product diverter 42a (or 42b), which further divides the sliced incoming products into two bins, to be later portioned to produce end products 1 and 2 (or 3 and 4), respectively. The production goals in the illustrated example may be the weight values (yields) or weight percentage values of all "finished" products, i.e., the sliced incoming products collected in the bins to be later portioned into various types of end products.

The production goals may be further defined in terms of any value that measures the efficiency or other desirability of the batch processing. For example, whether the incoming products are properly filling up the collection bins may be measured in terms of, for example, a flow rate (e.g., X % of the total incoming products to be collected in one bin is collected during time period Y), a rate of change of the flow rate, total incoming products (e.g., X weight values of the incoming products for producing type A end products have been collected in one bin, and Y weight values of the incoming products for producing type B end products have been collected in another bin), production trends (e.g., the incoming products for producing type A end products have been filling up a bin at an increasingly faster rate, while the incoming products for producing type B end products have been filling up another bin at an increasingly slower rate), etc. These values may be used to define the production goals as desired by the user for the batch processing. Then, the normalization of parameter values (e.g., yield values, yield percentage values, total values, etc.) may be carried out to meet the production goals, while at the same time achieving optimum parameter values.

In various exemplary embodiments of the present invention, results of actual sorting and batch processing are fed back to the processor 20 to be used in normalizing the parameter values. The information to be fed back may include, for example, a flow rate, a rate of change of the flow rate, total incoming products collected, and production trends. In other words, the processor 20 may receive feedback information indicating the current level of achievement of the production goals, which in turn may indicate how likely or well the production goals will be met at the end of the process. The processor 20 may then use this information to normalize parameter values so as to meet the production goals. For example, if the feedback information indicates that the current level of achievement of the production goals is less than optimal (e.g., under-achieved or over-achieved), the processor 20 may use the information in normalizing parameter values so as to compensate for the current level of achievement.

FIG. 4B illustrates continuous processing, in which all incoming products are sorted and directed to active portioning lines. Incoming products are scanned by a scanner 40 and sorted according to a method of the present invention. Thereafter, the sorted incoming products are automatically diverted by an auto product diverter 42 onto three different lines, each equipped with a servo slicer 44. Each of the servo slicers 44 performs a predefined slicing operation to the incoming product to produce a slicer trim. The sliced incoming products in each line are forwarded to a buffer conveyor 46, which is described in detail in co-assigned U.S. Patent Application Publication No. 2006/0163032 titled "Conveying Conformable Products," incorporated by reference herein. Briefly, the buffer conveyor 46 is configured to receive the sliced incoming products at a possibly non-uniform frequency and present them to the downstream portioner 48 at a uniform frequency. The portioner 48 performs a predefined portioning operation to the incoming products to thereby produce end products 1, 2, or 3.

The production goals in the illustrated example may be defined to keep each of the three portioning lines filled to capacity. In general, it is highly desirable to operate each portioning line at capacity to make maximum use of the overall system. However, since the automatic product diverter 42 is sorting random incoming products, there will be times when several incoming products in a row will be sent to one line, thereby overloading that line while starving the other lines. This problem may be mitigated by including the buffer conveyor 46 in each line, which can hold several extra (sliced) incoming products to thereby absorb the randomly occurring peaks and valleys in the production line and feed the (sliced) incoming products to the portioner 48 at a uniform frequency. The buffer conveyors 46 may feedback their operational status to the processor 20 so that the processor can consider the information when normalizing parameter values to meet the production goals. Specifically, when the production goals are set to keep each portioning line filled to capacity, the status of the buffer conveyor 46 used in each portioning line may be used to possibly divert some incoming products from a "busier" line to other lines. For example, if the buffer conveyor 46 of line 1 indicates that it is holding extra (sliced) incoming products while the buffer conveyors 46 of other lines indicate no extra holding, then the processor 20 may use this information in normalizing parameter values so as to convert some of the incoming products destined for line 1 to be instead sorted to other lines, to thereby meet the production goals.

As with the batch processing discussed above, the production goals for continuous processing may also be defined in terms of a flow rate (e.g., X % of the total type A end products to be produced is produced during time period Y), a rate of change of the flow rate, total end products (e.g., X weight values of type A end products have been produced, and Y weight values of type B end products have been produced), production trends (e.g., type A end products have been produced at an increasingly faster rate, while type B end products have been produced at an increasingly slower rate), etc.

FIG. 4C illustrates hybrid processing, in which some incoming products are sorted into collection bins for later processing/portioning, while other incoming products are sorted and directed to active portioning lines. Incoming products are scanned by a scanner 40 and sorted according to a method of the present invention. Thereafter, the sorted incoming products are automatically diverted by an auto product diverter 42 onto three different lines 43a, 43b, and 43c, each equipped with a servo slicer 44. Each of the servo slicers 44 performs a predefined slicing operation to the incoming product to produce a slicer trim. The sliced incoming products in the continuous-processing lines 43a and 43c are forwarded to buffer conveyors 46a, 46b, respectively, and thereafter presented to the downstream portioners 48 at a uniform frequency. The portioners 48 cut the sliced incoming products to produce end products 1 and 4, respectively. On the other hand, the sliced incoming products in the batch-processing line 43b are forwarded to another auto product diverter 42c, which further divides the sliced incoming products into two bins, to be later portioned into end products 2 and 3, respectively.

The production goals in the illustrated example may be the combination of the production goals for the continuous-processing lines 43a and 43c and the production goals for the batch-processing line 43b. For example, the buffer conveyors 46a and 46b may feedback their status to the processor 20 so that the processor 20 can consider the information to best meet the production goals directed to keeping each line operating at capacity. Likewise, the processor 20 may receive feedback information regarding results of the batch processing from the batch-processing line 43b and consider the information to best meet the production goals directed to maintaining a constant flow rate, a constant rate of a change of a flow rate, etc. In general, the normalizing process to meet the production goals responds to the state of the buffer conveyors 46a and 46b fairly quickly, while responding to the feedback information from the batch processing relatively slowly.

As should be apparent from the foregoing description, a method and system of the present invention permit sorting incoming products to meet various production goals, while at the same time making an optimum use of each of the incoming products as measured in terms of a parameter value. The production goals may define not only the final output to be achieved in terms of the quantities of end products to be produced, etc., but also how efficiently or desirably the production process should be carried out in terms of the line capacity, cost of operation, etc. A parameter value to be used may be selected from a wide range of values that indicate the suitability of an incoming product for producing a certain end product. Accordingly, a method and system of the present invention offer great flexibility in defining and meeting production goals while at the same time deriving an optimum (maximum) value out of each incoming product.

The embodiments of the invention in which an exclusive property or privilege is claimed are defined as follows:

1. A method for sorting incoming products to be portioned into two or more types of end products to meet production goals, the method comprising:
    (a) receiving information on incoming products;
    (b) for each incoming product, based on the received information, calculating a parameter value for each of the two or more types of end products that may be produced from the incoming product, the parameter value indicating suitability of the incoming product for producing each type of end product;
    (c) normalizing the calculated parameter values for the incoming products for the two or more types of end products, respectively, so as to meet the production goals while achieving optimum parameter values; and
    (d) for each incoming product, selecting the end product with an optimum normalized parameter value as the end product to be produced therefrom.

2. A computer-readable medium comprising computer-executable instructions for sorting incoming products to be portioned into two or more types of end products to meet production goals, wherein the computer-executable instructions, when loaded onto a computer, cause the computer to perform the steps comprising:
    (a) receiving information on incoming products;
    (b) for each incoming product, based on the received information, calculating a parameter value for each of the two or more types of end products that may be produced from the incoming product, the parameter value indicating suitability of the incoming product for producing each type of end product;
    (c) normalizing the calculated parameter values for the incoming products for the two or more types of end products, respectively, so as to meet the production goals while achieving optimum parameter values; and
    (d) for each incoming product, selecting the end product with an optimum normalized parameter value as the end product to be produced therefrom.

3. The computer-readable medium of claim 2, wherein the computer-executable instructions cause the computer to further perform storing the selection of the end product to be produced from each incoming product.

4. The computer-readable medium of claim 2, wherein the computer-executable instructions cause the computer to further perform receiving feedback from results of actual sorting and to perform step (c) in light of the received feedback.

5. The computer-readable medium of claim 4, wherein the feedback comprises information selected from a group consisting of: a flow rate of actual sorting, a rate of change of the flow rate of actual sorting, a status of a buffer used in actual sorting, total end products produced, and production trends.

6. The computer-readable medium of claim 2, wherein the parameter value is selected from a group consisting of: a yield value, a yield percentage value, a total value, a value indicating lack of defects in an incoming product, a geometric attribute value of an incoming product, and a visual attribute value of an incoming product.

7. The computer-readable medium of claim 6, wherein the total value is defined as follows: the value of an end product + the value of any trim produced during portioning of the end product − the cost of the incoming product from which the end product is to be produced.

8. The computer-readable medium of claim 2, wherein normalizing the calculated parameter values for the two or more types of end products, respectively, comprises adding to each of the calculated parameter values a factor associated with the corresponding end product.

9. The computer-readable medium of claim 8, wherein the mean of all of the factors to be added to the calculated parameter values for the two or more types of end products is 0.

10. The computer-readable medium of claim 2, wherein normalizing the calculated parameter values for the two or more types of end products, respectively, comprises multiplying each of the calculated parameter values by a factor associated with the corresponding end product.

11. The computer-readable medium of claim 10, wherein the product of all of the factors to be multiplied with the calculated parameter values for the two or more types of end products, respectively, is 1.

12. The computer-readable medium of claim 2, wherein the computer-executable instructions cause the computer to:
    continually perform step (a) to receive information on additional incoming products;
    continually perform step (b) to calculate, for each of the additional incoming products, a parameter value for each of the two or more types of end products that may be produced from the additional incoming product;

continually perform step (c) to normalize the calculated parameter values for the additional incoming products for the two or more types of end products, respectively, so as to meet the production goals while achieving optimum parameter values; and continually perform step (d), for each additional incoming product, to select the end product with an optimum normalized parameter value as the end product to be produced therefrom.

13. The computer-readable medium of claim 2, wherein the production goals are selected from a group consisting of:
 (a) weight values of the two or more types of end products to be produced;
 (b) weight percentage values of the two or more types of end products to be produced;
 (c) optimal sorting to collection bins;
 (d) sorting to continuous portioning processing to be carried out at an optimal capacity; and
 (e) sorting to collection bins and to continuous portioning processing to be carried out at an optimal capacity.

14. The computer-readable medium of claim 2, wherein the computer-executable instructions cause the computer to:
 receive modification to the production goals;
 perform step (c) to normalize the calculated parameter values for the incoming products for the two or more types of end products, respectively, so as to meet the modified production goals while achieving optimum parameter values; and
 perform step (d), for each incoming product, to select the end product with an optimum normalized parameter value as the end product to be produced therefrom.

15. A system for sorting incoming products to be portioned into two or more types of end products to meet production goals, the system comprising:
 (a) a processor; and
 (b) a scanner coupled to the processor for scanning incoming products and sending the scanned information of the incoming products to the processor;
 wherein the processor is configured to perform the steps of:
  (i) receiving the scanned information of the incoming products from the scanner;
  (ii) for each incoming product, based on the received scanned information, calculating a parameter value for each of the two or more types of end products that may be produced from the incoming product, the parameter value indicating suitability of the incoming product for producing each type of end product;
  (iii) normalizing the calculated parameter values for the incoming products for the two or more types of end products, respectively, so as to meet the production goals while achieving optimum parameter values; and
  (iv) for each incoming product, selecting the end product with the best normalized parameter value as the end product to be produced therefrom.

16. The system of claim 15, further comprising a product diverter coupled to the processor and configured to automatically sort the incoming products onto two or more lines for producing the two or more types of end products, respectively.

17. The system of claim 16, wherein at least one of the two or more lines sends sorted incoming products to a collection bin, and the processor is configured to perform the further steps of:
 receiving feedback from results of actual sorting to the collection bin; and
 normalizing the calculated parameter values for the incoming products for the two or more types of end products, respectively, so as to meet the production goals in light of the received feedback while achieving optimum parameter values.

18. The system of claim 17, wherein the feedback comprises information selected from a group consisting of: a flow rate of actual sorting to the collection bin, a rate of change of the flow rate of actual sorting to the collection bin, total incoming products collected in the bin, and production trends.

19. The system of claim 16, wherein at least one of the two or more lines sends sorted incoming products to continuous portioning processing, and the processor is configured to perform the further steps of:
 receiving feedback from results of actual sorting to the continuous portioning processing; and
 normalizing the calculated parameter values for the incoming products for the two or more types of end products, respectively, so as to meet the production goals in light of the received feedback while achieving optimum parameter values.

20. The system of claim 19, wherein the feedback comprises information selected from a group consisting of a flow rate of actual sorting through the continuous portioning processing, a rate of change of the flow rate of actual sorting through the continuous portioning processing, a status of a buffer used in the continuous portioning processing, total end products produced, and production trends.

* * * * *